United States Patent
Chan et al.

(10) Patent No.: US 8,040,027 B2
(45) Date of Patent: Oct. 18, 2011

(54) MULTI-PRIMARY COLOR DISPLAY AND COLOR FILTER

(75) Inventors: Chih-Cheng Chan, Hsin-Chu (TW); Guo-Feng Uei, Hsin-Chu (TW)

(73) Assignee: Au Optronics Corp., Hsin-Chu (TW)

( * ) Notice: Subject to any disclaimer, the term of this patent is extended or adjusted under 35 U.S.C. 154(b) by 884 days.

(21) Appl. No.: 12/076,320

(22) Filed: Mar. 17, 2008

(65) Prior Publication Data

US 2009/0073088 A1    Mar. 19, 2009

(30) Foreign Application Priority Data

Sep. 13, 2007    (TW) ................ 96134278 A

(51) Int. Cl.
*H01J 61/40* (2006.01)
*G02F 1/1335* (2006.01)

(52) U.S. Cl. ...................... 313/112; 349/106

(58) Field of Classification Search .......... 313/110–116; 349/106–109
See application file for complete search history.

(56) References Cited

U.S. PATENT DOCUMENTS

| | | |
|---|---|---|
| 4,994,901 A | 2/1991 | Parulski et al. |
| 5,384,519 A | 1/1995 | Gotoh |
| 6,570,584 B1 | 5/2003 | Cok et al. |
| 6,668,079 B2 | 12/2003 | Takemoto et al. |
| 7,027,117 B2 | 4/2006 | Hoshino et al. |
| 7,420,632 B2 * | 9/2008 | Tanaka et al. ............... 349/106 |
| 2004/0246389 A1 | 12/2004 | Roth |
| 2005/0094060 A1 * | 5/2005 | Kitayama et al. ............ 349/106 |
| 2005/0219443 A1 | 10/2005 | Tanaka et al. |
| 2006/0098033 A1 * | 5/2006 | Langendijk ................... 345/694 |
| 2006/0152524 A1 * | 7/2006 | Miller et al. ................... 345/589 |

FOREIGN PATENT DOCUMENTS

| | | | |
|---|---|---|---|
| CN | 1489761 A | | 4/2004 |
| CN | 1892350 A | | 1/2007 |
| JP | 2001194658 A | * | 7/2001 |
| JP | 2001306023 A | * | 11/2001 |
| JP | 2004333817 A | * | 11/2004 |
| JP | 2008064960 A | * | 3/2008 |
| JP | 2010191146 A | * | 9/2010 |
| TW | 200500999 | | 1/2005 |
| TW | 200643890 | | 6/2005 |
| TW | I237705 | | 8/2005 |

* cited by examiner

*Primary Examiner* — Mariceli Santiago

(74) *Attorney, Agent, or Firm* — Rabin & Berdo, P.C.

(57) ABSTRACT

When the coordinates of multiple primaries are set within specific ranges in a chromaticity diagram (e.g. the CIE 1931 chromaticity diagram), the proportion of the contrast ratio of one primary to the contrast ratio of the other primary should conform to some requirements to achieve the white balance of dark-state, so as to effectively display the natural color and mitigate the color shift of low-luminance images.

10 Claims, 7 Drawing Sheets

MULTI-PRIMARY COLOR DISPLAY AND COLOR FILTER

RELATED APPLICATIONS

This application claims priority to Taiwan Patent Application Serial Number 96134278, filed Sep. 13, 2007, which is herein incorporated by reference.

BACKGROUND

1. Field of Invention

The present invention relates to a display. More particularly, the present invention relates to a multi-primary color display.

2. Description of Related Art

With the fast development of technology, the application of displays has become more popular. Users look forward to displays that show varied and saturated colors. In general, displays usually only use the three primaries (e.g. red, blue, green) for mixing colors. However, the display using the three primaries does not completely display all of the natural colors, such as sky blue or gold. In conventional technology, to solve this problem, the above-mentioned three primaries are saturated to extend the color space. However, the solution has limited effectiveness and does not satisfy. Additionally, the solution may reduce the illumination of the display because of the characteristics of the display. On the other hand, the traditional display using the three primaries may add the other new primary. The new primary falls outside the triangular color space in the CIE 1931 chromaticity diagram, where the triangular color space is formed by the three primaries. Thus, it is effective for the display to extend the color space. Besides, the display may maintain or enhance the illumination thereof.

SUMMARY

It is therefore an objective of the present invention to provide a display device.

In accordance with an embodiment of the present invention, the display device comprises a plurality of pixels, each pixel having at least four sub-pixels, wherein the sub-pixels respectively display a red primary, a green primary, a blue primary and a yellow primary, where the yellow primary falls within a polygon defined by following vertexes in a CIE 1931 chromaticity diagram:

|  | X coordinate | Y coordinate |
| --- | --- | --- |
| Vertex 1 | 0.53 | 0.44 |
| Vertex 2 | 0.544 | 0.454 |
| Vertex 3 | 0.408 | 0.589 |
| Vertex 4 | 0.39 | 0.556 | and proportions of a contrast ratio of the yellow primary to the contrast ratio of the other primaries are:

$0.58 \leq$ the proportion of the contrast ratio of the yellow primary to the contrast ratio of the red primary $\leq 2.4$;

$0.39 \leq$ the proportion of the contrast ratio of the yellow primary to the contrast ratio of the green primary $\leq 2.4$; and $0.58 \leq$ the proportion of the contrast ratio of the yellow primary to the contrast ratio of the blue primary $\leq 1.78$.

It is another objective of the present invention to provide a display device.

In accordance with another embodiment of the display device comprises a plurality of pixels, each pixel having at least four sub-pixels, wherein the sub-pixels respectively display a red primary, a green primary, a blue primary and a cyan primary, where the cyan primary falls within a polygon defined by following vertexes in a CIE 1931 chromaticity diagram:

|  | X coordinate | Y coordinate |
| --- | --- | --- |
| Vertex 1 | 0.165 | 0.408 |
| Vertex 2 | 0.142 | 0.165 |
| Vertex 3 | 0.104 | 0.141 |
| Vertex 4 | 0.106 | 0.396 | and proportions of a contrast ratio of the cyan primary to the contrast ratio of the other primaries are:

$0.41 \leq$ the proportion of the contrast ratio of the cyan primary to the contrast ratio of the red primary $\leq 4.86$;

$0.28 \leq$ the proportion of the contrast ratio of the cyan primary to the contrast ratio of the green primary $\leq 4.86$; and $0.28 \leq$ the proportion of the contrast ratio of the cyan primary to the contrast ratio of the blue primary $\leq 4.39$.

It is another objective of the present invention to provide a color filter for use in a flat-panel display.

In accordance with another embodiment of the color filter of the flat-panel display comprises a plurality of color filter units, wherein the color filter units respectively generates a red primary, a green primary, a blue primary and a yellow primary, where the yellow primary falls within a polygon defined by following vertexes in a CIE 1931 chromaticity diagram:

|  | X coordinate | Y coordinate |
| --- | --- | --- |
| Vertex 1 | 0.53 | 0.44 |
| Vertex 2 | 0.544 | 0.454 |
| Vertex 3 | 0.408 | 0.589 |
| Vertex 4 | 0.39 | 0.556 | and proportions of a contrast ratio of the yellow primary to the contrast ratio of the other primaries are:

$0.58 \leq$ the proportion of the contrast ratio of the yellow primary to the contrast ratio of the red primary $\leq 2.4$;

$0.39 \leq$ the proportion of the contrast ratio of the yellow primary to the contrast ratio of the green primary $\leq 2.4$; and $0.58 \leq$ the proportion of the contrast ratio of the yellow primary to the contrast ratio of the blue primary $\leq 1.78$.

It is another objective of the present invention to provide a color filter for use in a flat-panel display.

In accordance with another embodiment of the color filter of the flat-panel display comprises a plurality of color filter units, wherein the color filter units respectively generates a red primary, a green primary, a blue primary and a cyan primary, where the cyan primary falls within a polygon defined by following vertexes in a CIE 1931 chromaticity diagram:

|  | X coordinate | Y coordinate |
| --- | --- | --- |
| Vertex 1 | 0.165 | 0.408 |
| Vertex 2 | 0.142 | 0.165 |

-continued

| | X coordinate | Y coordinate |
|---|---|---|
| Vertex 3 | 0.104 | 0.141 |
| Vertex 4 | 0.106 | 0.396 | and proportions of a contrast ratio of the cyan primary to the contrast ratio of the other primaries are:

0.41≦the proportion of the contrast ratio of the cyan primary to the contrast ratio of the red primary≦4.86;

0.28≦the proportion of the contrast ratio of the cyan primary to the contrast ratio of the green primary≦4.86; and 0.28≦the proportion of the contrast ratio of the cyan primary to the contrast ratio of the blue primary≦4.39.

It is to be understood that both the foregoing general description and the following detailed description are by examples, and are intended to provide further explanation of the invention as claimed.

BRIEF DESCRIPTION OF THE DRAWINGS

For more complete understanding of the present invention, and the advantages thereof, reference is now made to the following descriptions taken in conjunction with the accompanying drawing, in which.

DESCRIPTION OF THE PREFERRED EMBODIMENTS

Figure 1:
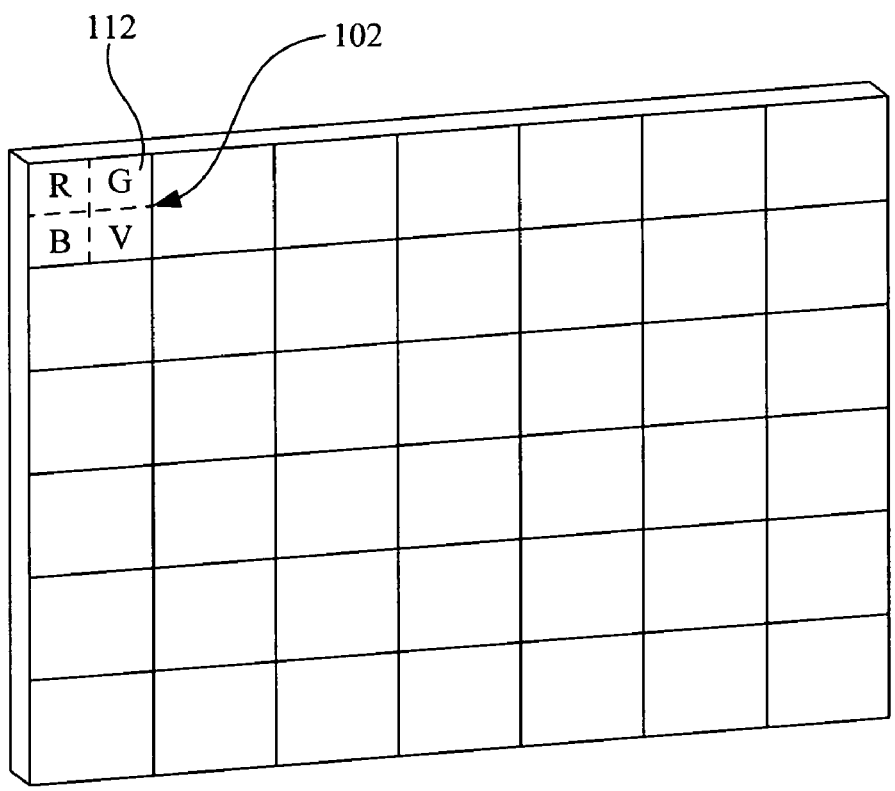
FIG. 1 is a schematic diagram of a display device according to an embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

In a three-primaries system, the signal values (R, G, B) of three primaries are converted into the tri-stimulus values (X, Y, Z) of the mixing color using equation (1):

$$\begin{bmatrix} X \\ Y \\ Z \end{bmatrix} = \begin{bmatrix} X_R & X_G & X_B \\ Y_R & Y_G & Y_B \\ Z_R & Z_G & Z_B \end{bmatrix} \times \begin{bmatrix} R \\ G \\ B \end{bmatrix} \quad (1)$$

where $X_i$, $Y_i$, $Z_i$ represent the tri-stimulus values corresponding to the maximum primaries associated with i; and the limitation for the signal values (R, G, B) is in the range 0 to 1.

The tri-stimulus values $(X_w, Y_w, Z_w)$ of the white balance are obtained when the signal values are the maxima (i.e. R=G=B=1) as the following equation (2):

$$\begin{bmatrix} X_W \\ Y_W \\ Z_W \end{bmatrix} = \begin{bmatrix} X_R & X_G & X_B \\ Y_R & Y_G & Y_B \\ Z_R & Z_G & Z_B \end{bmatrix} \times \begin{bmatrix} 1 \\ 1 \\ 1 \end{bmatrix} \quad (2)$$

A four-primaries system is similar to the three-primaries system by adding a new primary (V) to the three-primaries system, such that the maximum signal values (i.e. R=G=B=V=1) are converted into the tri-stimulus values (X, Y, Z) of the mixing color using equation (3):

$$\begin{bmatrix} X_W \\ Y_W \\ Z_W \end{bmatrix} = \begin{bmatrix} X_R & X_G & X_B & X_V \\ Y_R & Y_G & Y_B & Y_V \\ Z_R & Z_G & Z_B & Z_V \end{bmatrix} \times \begin{bmatrix} 1 \\ 1 \\ 1 \\ 1 \end{bmatrix} \quad (3)$$

If chromatic values (x, y) of one primary and luminance (i.e. Y of the tri-stimulus values) are known, X and Z of the tri-stimulus values are represented using equation (4):

$$X = \frac{x}{y} Y \quad (4)$$

$$Z = \frac{z}{y} Y$$

Hence, equation (3) may be transformed into equation (5) with equation (4):

$$\begin{bmatrix} \frac{x_W}{y_W} Y_W \\ Y_W \\ \frac{z_W}{y_W} Y_W \end{bmatrix} = \begin{bmatrix} \frac{x_R}{y_R} Y_R & \frac{x_G}{y_G} Y_G & \frac{x_B}{y_B} Y_B & \frac{x_V}{y_V} Y_V \\ Y_R & Y_G & Y_B & Y_V \\ \frac{z_R}{y_R} Y_R & \frac{z_G}{y_G} Y_G & \frac{z_B}{y_B} Y_B & \frac{z_V}{y_V} Y_V \end{bmatrix} \times \begin{bmatrix} 1 \\ 1 \\ 1 \\ 1 \end{bmatrix} \quad (5)$$

Then, by calculation, the following equations (6)-(8) are obtained by transferring the blue primary (B) and new primary (V) to the left of the equals sign.

$$\begin{bmatrix} \frac{x_W}{y_W} Y_W - \frac{x_B}{y_B} Y_B - \frac{x_V}{y_V} Y_V \\ Y_W - Y_B - Y_V \\ \frac{z_W}{y_W} Y_W - \frac{z_B}{y_B} Y_B - \frac{z_V}{y_V} Y_V \end{bmatrix} = \begin{bmatrix} \frac{x_R}{y_R} Y_R + \frac{x_G}{y_G} Y_G \\ Y_R + Y_G \\ \frac{z_R}{y_R} Y_R + \frac{z_G}{y_G} Y_G \end{bmatrix} \quad (6)$$

$$\begin{bmatrix} \frac{x_W}{y_W} & -\frac{x_B}{y_B} & -\frac{x_V}{y_V} \\ 1 & -1 & -1 \\ \frac{z_W}{y_W} & -\frac{z_B}{y_B} & -\frac{z_V}{y_V} \end{bmatrix} \times \begin{bmatrix} Y_W \\ Y_B \\ Y_V \end{bmatrix} = \begin{bmatrix} \frac{x_R}{y_R} Y_R + \frac{x_G}{y_G} Y_G \\ Y_R + Y_G \\ \frac{z_R}{y_R} Y_R + \frac{z_G}{y_G} Y_G \end{bmatrix} \quad (7)$$

$$\rightarrow$$

$$\begin{bmatrix} Y_W \\ Y_B \\ Y_V \end{bmatrix} = \begin{bmatrix} \frac{x_W}{y_W} & -\frac{x_B}{y_B} & -\frac{x_V}{y_V} \\ 1 & -1 & -1 \\ \frac{z_W}{y_W} & -\frac{z_B}{y_B} & -\frac{z_V}{y_V} \end{bmatrix}^{-1} \times \begin{bmatrix} \frac{x_R}{y_R} Y_R + \frac{x_G}{y_G} Y_G \\ Y_R + Y_G \\ \frac{z_R}{y_R} Y_R + \frac{z_G}{y_G} Y_G \end{bmatrix} \quad (8)$$

Therefore, the luminance ($Y_w$) in the white balance, the luminance ($Y_B$) of the blue primary and the luminance ($Y_v$) of the new primary are obtained though equation (8) if the chromatic values (x, y) in the white balance and each primary are known, and the luminance ($Y_R$) of the suitable red primary and the luminance ($Y_G$) of the suitable green primary are given.

The simulation method according to embodiments of the present invention is disclosed. When the coordinates of multiple primaries are set within specific ranges in a chromaticity diagram (e.g. the CIE 1931 chromaticity diagram), the proportions of a contrast ratio of one primary to the contrast ratio of the other primaries should conform to some requirements to achieve the white balance of dark-state, so as to effectively display the natural color and mitigate the color shift of low-luminance images.

In accordance with the embodiments of the present invention, the simulation method includes the following steps:

1. First, the coordinates of red primary, green primary, blue primary and the other new primaries (i.e. cyan primary and yellow primary) are set within the specific ranges in a chromaticity diagram. Table 1 of the specific range for each primary is shown below:

TABLE 1

|  |  | x coordinate | y coordinate |
|---|---|---|---|
| red polygon | Vertex 1 | 0.64 | 0.29 |
|  | Vertex 2 | 0.691 | 0.308 |
|  | Vertex 3 | 0.648 | 0.351 |
|  | Vertex 4 | 0.64 | 0.34 |
| green polygon | Vertex 1 | 0.32 | 0.587 |
|  | Vertex 2 | 0.2 | 0.535 |
|  | Vertex 3 | 0.21 | 0.71 |
| blue polygon | Vertex 1 | 0.19 | 0.072 |
|  | Vertex 2 | 0.162 | 0.04 |
|  | Vertex 3 | 0.104 | 0.141 |
|  | Vertex 4 | 0.142 | 0.165 |
| cyan polygon | Vertex 1 | 0.165 | 0.408 |
|  | Vertex 2 | 0.142 | 0.165 |
|  | Vertex 3 | 0.104 | 0.141 |
|  | Vertex 4 | 0.106 | 0.396 |
| yellow polygon | Vertex 1 | 0.53 | 0.44 |
|  | Vertex 2 | 0.544 | 0.454 |
|  | Vertex 3 | 0.408 | 0.589 |
|  | Vertex 4 | 0.39 | 0.556 |

2. A set of multiple primaries, including the chromatic values of three basic primaries and at least one new primary, are selected in Table 1. Particularly, the chromatic values of three basic primaries (i.e. red, green, and blue primaries) and the chromatic values of at least one new primary (i.e. cyan primary and/or yellow primary) are respectively close to the corners of the specific ranges in the chromaticity diagram.

Moreover, the maximum luminance of the chromatic values (i.e. Y of the tri-stimulus values) is set, such that the set of multiple primaries to achieve the white balance when all signal values of the primaries are equal to 1. Thus, the maximum luminance (Y) and the chromatic values are obtained when all signal values of the set of multiple primaries are equal to 1.

3. According to the experimental data, the minimum chromatic value is obtained when the signal values of the primaries are equal to 0 (i.e. the luminance of the darkest state). On the other hand, the maximum chromatic value is obtained when the signal values of the primaries are equal to 1 (i.e. the luminance of the brightest state). The maximum chromatic value minus the minimum chromatic value leaves 0.05.

4. According to the present manufacturing technology, the contrast ratio ($CR_R$) of the red primary is lowest in the three basic primaries, and the other, i.e. the contrast ratio ($CR_G$) of the green primary or the contrast ratio ($CR_B$) of the blue primary, are about 1-1.5 times the contrast ratio ($CR_R$) of the red primary. Hence, in the simulate method, $CR_G/CR_R=1$-1.5 may be assumed.

5. Thus, according to $CR_G/CR_R$ in step 4, additionally, according to the luminance of the red primary and the luminance of the green primary at the brightest state in step 2, the luminance ($Y_R$) of the red primary and the luminance ($Y_G$) of the green primary at the darkest state are obtained.

6. The chromatic values (x, y) of each primary at the dark state, the luminance ($Y_R$) of the red primary and the luminance ($Y_G$) of the green primary at the dark state and the chromatic values (x, y) in the white balance, e.g. (0.28,0.29), are converted into the luminance ($Y_B$) of the blue primary at the dark state and the luminance ($Y_V$) of the new primary at the dark state are carried out according to equation (8). As a result of the luminance of the blue primary at the bright state and the luminance of the new primary at the bright state being known, the proportion of the contrast ratio of the blue primary (B) to the contrast ratio of the new primary is obtained. Therefore, the proportion of the contrast ratio of one primary to the contrast ratio of the other primary is also obtained by calculation, e.g. $CR_V/CR_R$, $CR_V/CR_G$ and $CR_V/CR_B$.

According to the above-mentioned simulation method, when the coordinates of multiple primaries are set within specific ranges in a chromaticity diagram (e.g. the CIE 1931 chromaticity diagram), the proportions of the contrast ratio of one primary to the contrast ratio of the other primaries should conform to some requirements to achieve the white balance of the dark-state, so as to effectively display the natural color and mitigate the color shift of low-luminance images.

FIG. 1 is a schematic diagram of a display device 100 according to an embodiment of the present invention. The display device 100 includes a plurality of pixels 102, each pixel having at least four sub-pixels 112, where the sub-pixels 112 respectively display the red primary, the green primary, the blue primary, the yellow primary and at least one new primary. For example, the display device 100 may be a flat-panel display, such as a self-luminous display device, e.g. OLED display, or a back light display device, e.g. LCD.

Figure 2:
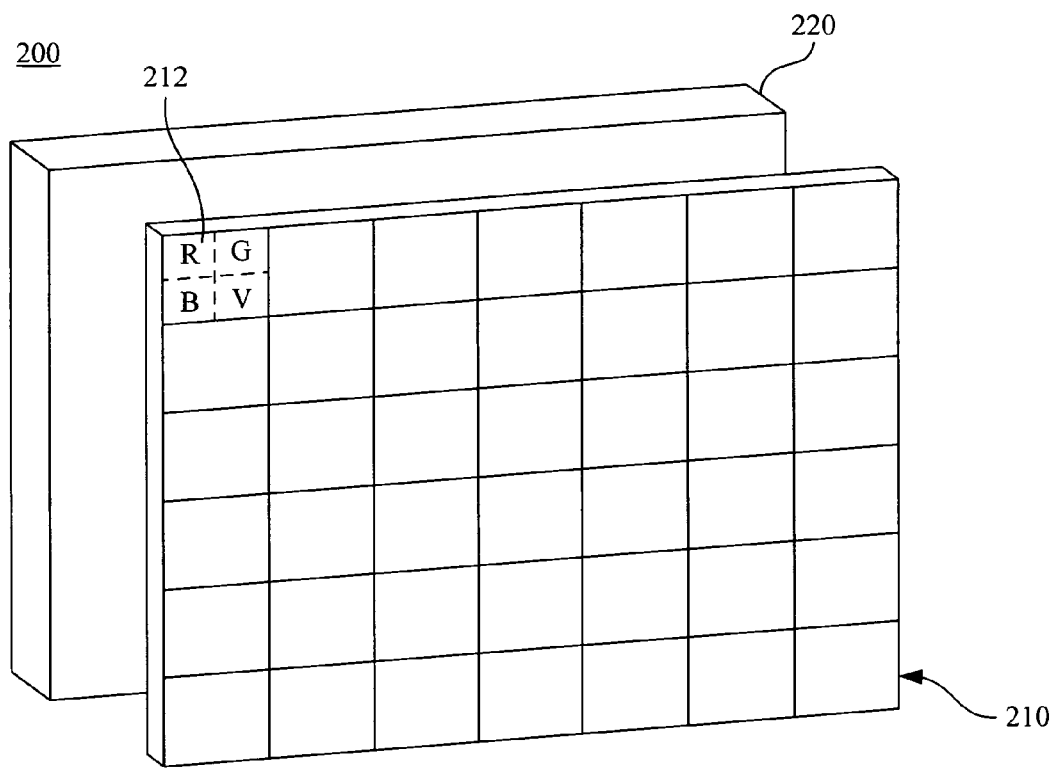
FIG. 2 is a schematic diagram of the color filter of a flat-panel display according to another embodiment of the present invention.

FIG. 2 is a schematic diagram of a color filter 210 of a flat-panel display 200 according to another embodiment of the present invention. The color filter 210 includes a plurality of color filter units 212, where the color filter units respectively generate the red primary, the green primary, the blue primary, the yellow primary and at least one new primary. The color filter 210 may be disposed in the flat-panel display 200. For example, the flat-panel display 200 may be an LCD in which the component 220 including a back light source and elements of pixels may cooperate with the color filter 210 to display the color image.

The multiple primaries are applied in the sub-pixel 112 or the color filter unit 212 according to the ten embodiments of the present invention as shown below. In the ten embodiments, the coordinates of the multiple primaries within specific ranges in a chromaticity diagram, and the proportions of a contrast ratio of one primary to the contrast ratio of the other primaries is disclosed.

The First Embodiment

Figure 3:
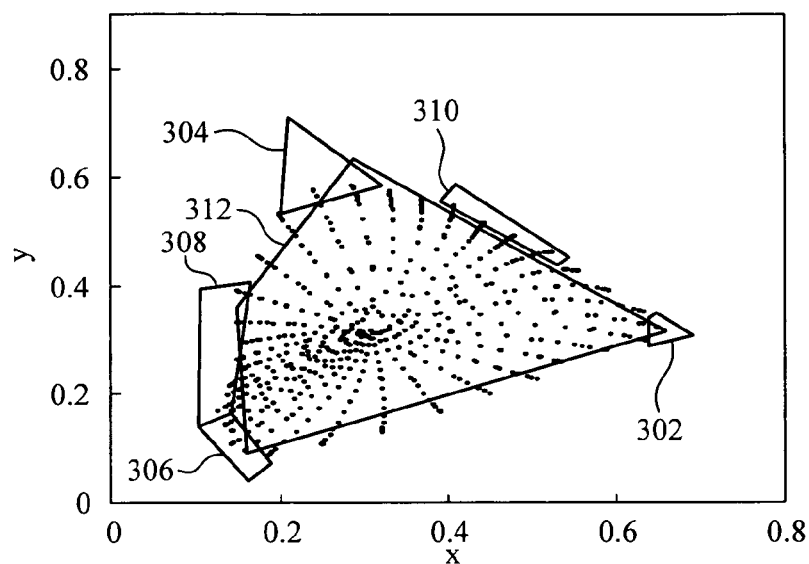
FIG. 3 is a CIE 1931 chromaticity diagram according to a first embodiment of the present invention.

FIG. 3 is a CIE 1931 chromaticity diagram according to a first embodiment of the present invention. Respectively, the red primary falls within the polygon 302, the green primary falls within the polygon 304, the blue primary falls within a polygon 306, the cyan primary falls within the polygon 308, and the yellow primary falls within the polygon 310. The dots represent the natural color. In the first embodiment, the coordinates of the multiple primaries and the proportions of a contrast ratio of one primary to the contrast ratio of the other primaries are limited within the specific range, e.g. the polygon 312, in the chromaticity diagram.

In the first embodiment, in Table 2, the coordinates of the multiple primaries represent the chromatic values of red primary, green primary, blue primary and the cyan primary are selected from Table 1. Additionally, according to the above-mentioned simulation method, the proportions of the contrast ratio of the cyan primary to the contrast ratio of the other primaries are obtained as shown in Table 3.

TABLE 2

|  | x coordinate | y coordinate |
|---|---|---|
| chromatic value of red primary | 0.661 | 0.317 |
| chromatic value of green primary | 0.288 | 0.634 |
| chromatic value of blue primary | 0.16 | 0.09 |
| chromatic value of cyan primary | 0.15 | 0.35 |

TABLE 3

| proportion of the contrast ratio of cyan primary to the contrast ratio of red primary | proportion of the contrast ratio of cyan primary to the contrast ratio of green primary | proportion of the contrast ratio of cyan primary to the contrast ratio of blue primary |
|---|---|---|
| 0.43 | 0.29 | 0.29 |

The Second Embodiment

Figure 4:
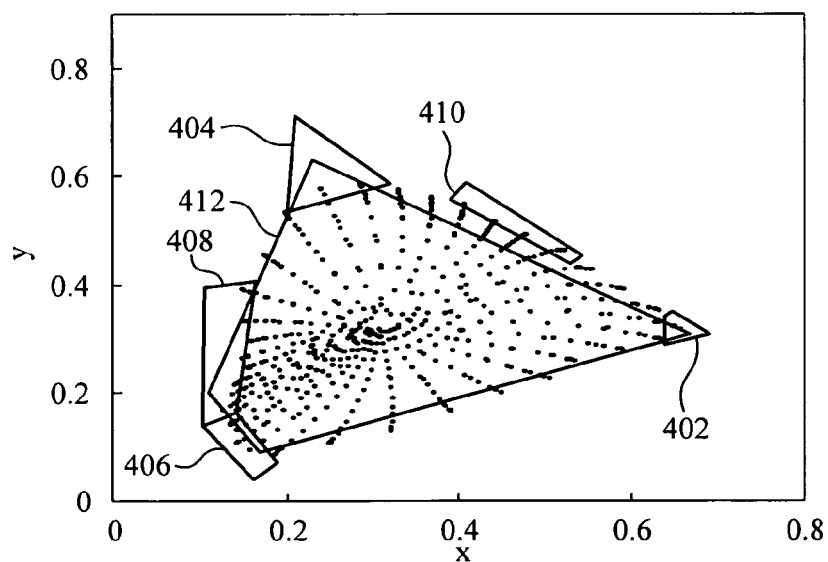
FIG. 4 is a CIE 1931 chromaticity diagram according to a second embodiment of the present invention.

FIG. 4 is a CIE 1931 chromaticity diagram according to a second embodiment of the present invention. Respectively, the red primary falls within the polygon 402, the green primary falls within the polygon 404, the blue primary falls within a polygon 406, the cyan primary falls within the polygon 408, and the yellow primary falls within the polygon 410. The dots represent the natural color. In the second embodiment, the coordinates of the multiple primaries and the proportions of the contrast ratio of one primary to the contrast ratio of the other primaries are limited within the specific range, e.g. the polygon 412, in the chromaticity diagram.

In the second embodiment, in Table 4, the coordinates of the multiple primaries represent the chromatic values of red primary, green primary, blue primary and the cyan primary are selected from Table 1. Additionally, according to the above-mentioned simulation method, the proportions of the contrast ratio of the cyan primary to the contrast ratio of the other primaries are obtained as shown in Table 5.

TABLE 4

|  | x coordinate | y coordinate |
|---|---|---|
| chromatic value of red primary | 0.67 | 0.31 |
| chromatic value of green primary | 0.23 | 0.63 |
| chromatic value of blue primary | 0.17 | 0.09 |
| chromatic value of cyan primary | 0.11 | 0.2 |

TABLE 5

| proportion of the contrast ratio of cyan primary to the contrast ratio of red primary | proportion of the contrast ratio of cyan primary to the contrast ratio of green primary | proportion of the contrast ratio of cyan primary to the contrast ratio of blue primary |
|---|---|---|
| 1.51 | 1.21 | 1.04 |

The Third Embodiment

Figure 5:
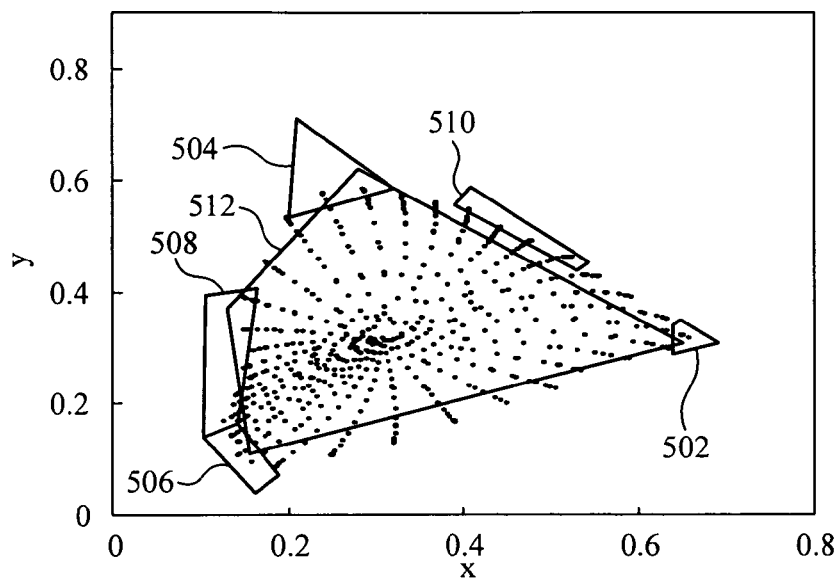
FIG. 5 is a CIE 1931 chromaticity diagram according to a third embodiment of the present invention.

FIG. 5 is a CIE 1931 chromaticity diagram according to a third embodiment of the present invention. Respectively, the red primary falls within the polygon 502, the green primary falls within the polygon 504, the blue primary falls within a polygon 406, the cyan primary falls within the polygon 508, and the yellow primary falls within the polygon 510. The dots represent the natural color. In the third embodiment, the coordinates of the multiple primaries and the proportions of the contrast ratio of one primary to the contrast ratio of the other primaries are limited within the specific range, e.g. the polygon 512, in the chromaticity diagram.

In the third embodiment, in Table 6, the coordinates of the multiple primaries represent the chromatic values of red primary, green primary, blue primary and the cyan primary are selected from Table 1. Additionally, according to the above-mentioned simulation method, the proportions of the contrast ratio of the cyan primary to the contrast ratio of the other primaries are obtained as shown in Table 7.

TABLE 6

|  | x coordinate | y coordinate |
|---|---|---|
| chromatic value of red primary | 0.65 | 0.31 |
| chromatic value of green primary | 0.28 | 0.62 |
| chromatic value of blue primary | 0.155 | 0.11 |
| chromatic value of cyan primary | 0.13 | 0.37 |

TABLE 7

| proportion of the contrast ratio of cyan primary to the contrast ratio of red primary | proportion of the contrast ratio of cyan primary to the contrast ratio of green primary | proportion of the contrast ratio of cyan primary to the contrast ratio of blue primary |
|---|---|---|
| 2.92 | 2.92 | 2.6 |

The Fourth Embodiment

Figure 6:
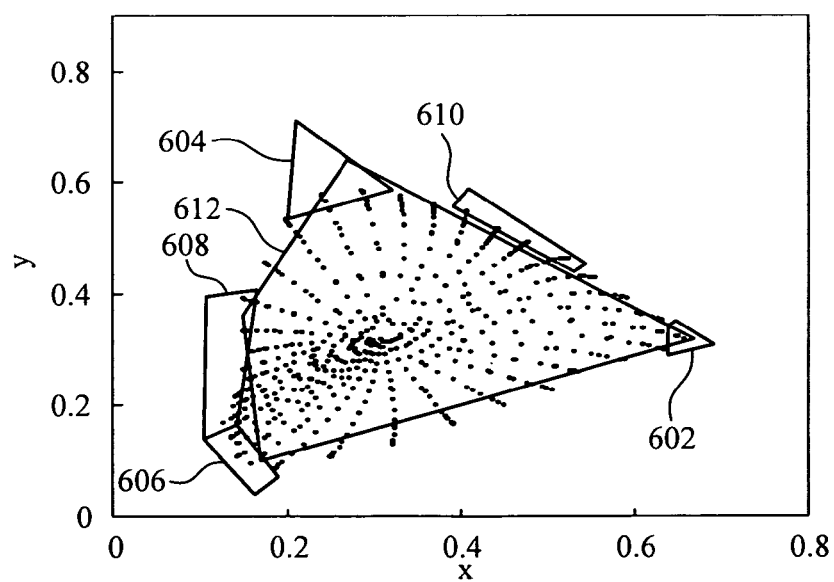
FIG. 6 is a CIE 1931 chromaticity diagram according to a fourth embodiment of the present invention.

FIG. 6 is a CIE 1931 chromaticity diagram according to a fourth embodiment of the present invention. Respectively, the red primary falls within the polygon 602, the green primary falls within the polygon 604, the blue primary falls within a polygon 606, the cyan primary falls within the polygon 608, and the yellow primary falls within the polygon 610. The dots represent the natural color. In the fourth embodiment, the coordinates of the multiple primaries and the proportions of the contrast ratio of one primary to the contrast ratio of the other primaries are limited within the specific range, e.g. the polygon 612, in the chromaticity diagram.

In the fourth embodiment, in Table 8, the coordinates of the multiple primaries represent the chromatic values of red primary, green primary, blue primary and the cyan primary are selected from Table 1. Additionally, according to the above-mentioned simulation method; the proportions of the contrast ratio of the cyan primary to the contrast ratio of the other primaries are obtained as shown in Table 9.

TABLE 8

|                                  | x coordinate | y coordinate |
|----------------------------------|--------------|--------------|
| chromatic value of red primary   | 0.67         | 0.32         |
| chromatic value of green primary | 0.27         | 0.64         |
| chromatic value of blue primary  | 0.17         | 0.1          |
| chromatic value of cyan primary  | 0.15         | 0.36         |

TABLE 9

| proportion of the contrast ratio of cyan primary to the contrast ratio of red primary | proportion of the contrast ratio of cyan primary to the contrast ratio of green primary | proportion of the contrast ratio of cyan primary to the contrast ratio of blue primary |
|---|---|---|
| 3.73 | 3.73 | 3.3 |

The Fifth Embodiment

Figure 7:
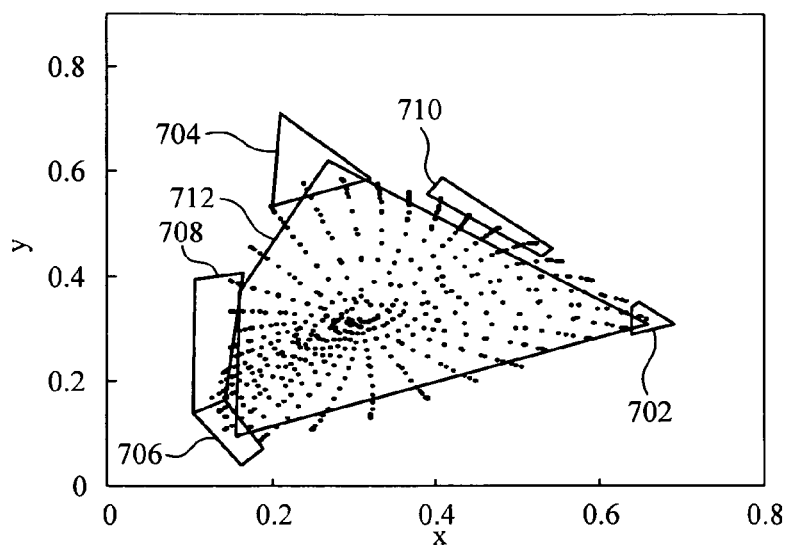
FIG. 7 is a CIE 1931 chromaticity diagram according to a fifth embodiment of the present invention.

FIG. 7 is a CIE 1931 chromaticity diagram according to a fifth embodiment of the present invention. Respectively, the red primary falls within the polygon 702, the green primary falls within the polygon 704, the blue primary falls within a polygon 706, the cyan primary falls within the polygon 708, and the yellow primary falls within the polygon 710. The dots represent the natural color. In the fifth embodiment, the coordinates of the multiple primaries and the proportions of the contrast ratio of one primary to the contrast ratio of the other primaries are limited within the specific range, e.g. the polygon 712, in the chromaticity diagram.

In the fifth embodiment, in Table 10, the coordinates of the multiple primaries represent the chromatic values of red primary, green primary, blue primary and the cyan primary are selected from Table 1. Additionally, according to the above-mentioned simulation method, the proportions of the contrast ratio of the cyan primary to the contrast ratio of the other primaries are obtained as shown in Table 11.

TABLE 10

|                                  | x coordinate | y coordinate |
|----------------------------------|--------------|--------------|
| chromatic value of red primary   | 0.66         | 0.31         |
| chromatic value of green primary | 0.27         | 0.62         |
| chromatic value of blue primary  | 0.155        | 0.095        |
| chromatic value of cyan primary  | 0.16         | 0.37         |

TABLE 11

| proportion of the contrast ratio of cyan primary to the contrast ratio of red primary | proportion of the contrast ratio of cyan primary to the contrast ratio of green primary | proportion of the contrast ratio of cyan primary to the contrast ratio of blue primary |
|---|---|---|
| 4.8 | 4.8 | 4.17 |

The Sixth Embodiment

Figure 8:
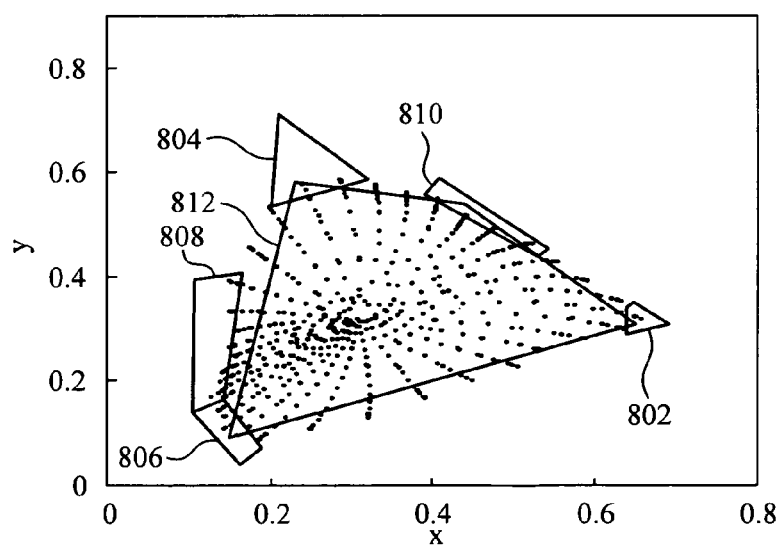
FIG. 8 is a CIE 1931 chromaticity diagram according to a sixth embodiment of the present invention.

FIG. 8 is a CIE 1931 chromaticity diagram according to a sixth embodiment of the present invention. Respectively, the red primary falls within the polygon 802, the green primary falls within the polygon 804, the blue primary falls within a polygon 806, the cyan primary falls within the polygon 808, and the yellow primary falls within the polygon 810. The dots represent the natural color. In the sixth embodiment, the coordinates of the multiple primaries and the proportions of the contrast ratio of one primary to the contrast ratio of the other primaries are limited within the specific range, e.g. the polygon 812, in the chromaticity diagram.

In the sixth embodiment, in Table 12, the coordinates of the multiple primaries represent the chromatic values of red primary, green primary, blue primary and the yellow primary are selected from Table 1. Additionally, according to the above-mentioned simulation method, the proportions of the contrast ratio of the yellow primary to the contrast ratio of the other primaries are obtained as shown in Table 13.

TABLE 12

|                                    | x coordinate | y coordinate |
|------------------------------------|--------------|--------------|
| chromatic value of red primary     | 0.65         | 0.31         |
| chromatic value of green primary   | 0.23         | 0.58         |
| chromatic value of blue primary    | 0.15         | 0.09         |
| chromatic value of yellow primary  | 0.44         | 0.54         |

TABLE 13

| proportion of the contrast ratio of yellow primary to the contrast ratio of red primary | proportion of the contrast ratio of yellow primary to the contrast ratio of green primary | proportion of the contrast ratio of yellow primary to the contrast ratio of blue primary |
|---|---|---|
| 0.61 | 0.61 | 0.6 |

The Seventh Embodiment

Figure 9:
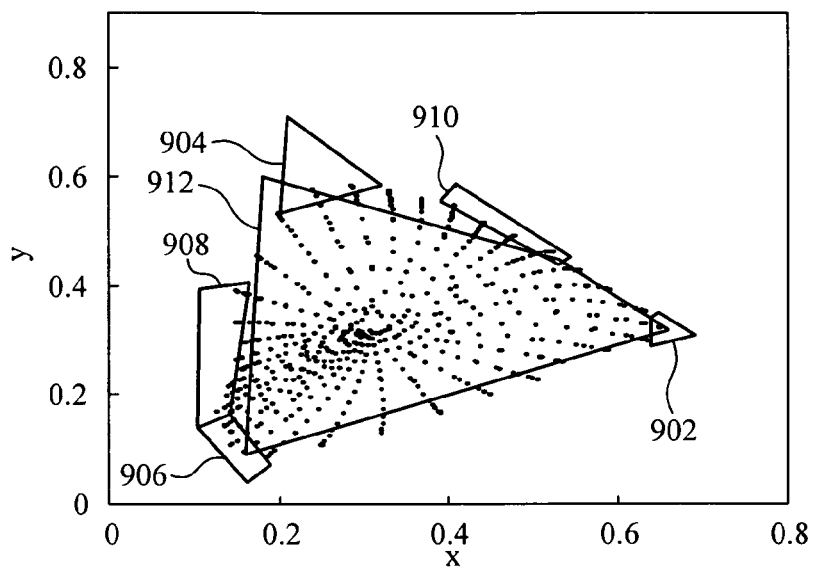
FIG. 9 is a CIE 1931 chromaticity diagram according to a seventh embodiment of the present invention.

FIG. 9 is a CIE 1931 chromaticity diagram according to a seventh embodiment of the present invention. Respectively, the red primary falls within the polygon 902, the green primary falls within the polygon 904, the blue primary falls within a polygon 906, the cyan primary falls within the polygon 908, and the yellow primary falls within the polygon 910. The dots represent the natural color. In the seventh embodiment, the coordinates of the multiple primaries and the proportions of the contrast ratio of one primary to the contrast ratio of the other primaries are limited within the specific range, e.g. the polygon 912, in the chromaticity diagram.

In the seventh embodiment, in Table 14, the coordinates of the multiple primaries represent the chromatic values of red primary, green primary, blue primary and the yellow primary are selected from Table 1. Additionally, according to the above-mentioned simulation method, the proportions of the contrast ratio of the yellow primary to the contrast ratio of the other primaries are obtained as shown in Table 15.

TABLE 14

|  | x coordinate | y coordinate |
|---|---|---|
| chromatic value of red primary | 0.661 | 0.32 |
| chromatic value of green primary | 0.18 | 0.6 |
| chromatic value of blue primary | 0.16 | 0.09 |
| chromatic value of yellow primary | 0.53 | 0.45 |

TABLE 15

| proportion of the contrast ratio of yellow primary to the contrast ratio of red primary | proportion of the contrast ratio of yellow primary to the contrast ratio of green primary | proportion of the contrast ratio of yellow primary to the contrast ratio of blue primary |
|---|---|---|
| 1.01 | 1.01 | 0.87 |

The Eighth Embodiment

Figure 10:
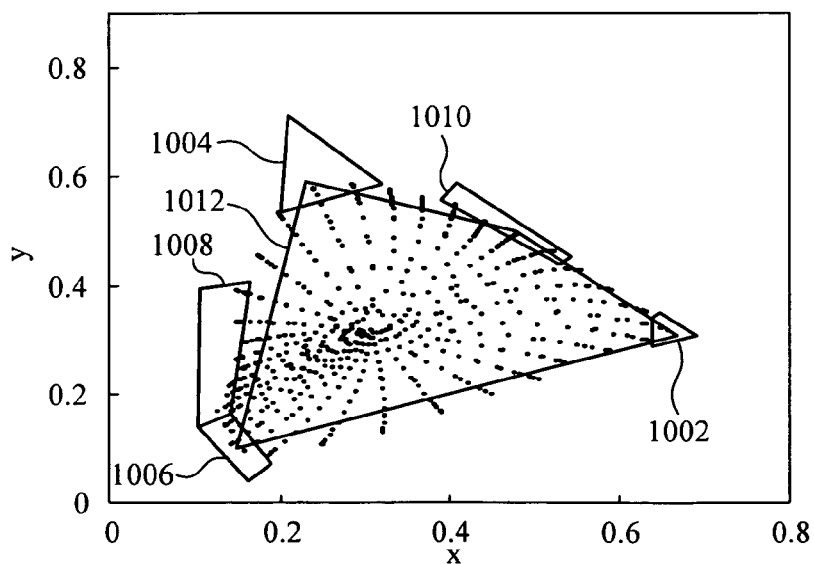
FIG. 10 is a CIE 1931 chromaticity diagram according to an eighth embodiment of the present invention.

FIG. 10 is a CIE 1931 chromaticity diagram according to an eighth embodiment of the present invention. Respectively, the red primary falls within the polygon 1002, the green primary falls within the polygon 1004, the blue primary falls within a polygon 1006, the cyan primary falls within the polygon 1008, and the yellow primary falls within the polygon 1010. The dots represent the natural color. In the eighth embodiment, the coordinates of the multiple primaries and the proportions of the contrast ratio of one primary to the contrast ratio of the other primaries are limited within the specific range, e.g. the polygon 1012, in the chromaticity diagram.

In the eighth embodiment, in Table 16, the coordinates of the multiple primaries represent the chromatic values of red primary, green primary, blue primary and the yellow primary are selected from Table 1. Additionally, according to the above-mentioned simulation method, the proportions of the contrast ratio of the yellow primary to the contrast ratio of the other primaries are obtained as shown in Table 17.

TABLE 16

|  | x coordinate | y coordinate |
|---|---|---|
| chromatic value of red primary | 0.67 | 0.31 |
| chromatic value of green primary | 0.23 | 0.59 |
| chromatic value of blue primary | 0.15 | 0.1 |
| chromatic value of yellow primary | 0.48 | 0.5 |

TABLE 17

| proportion of the contrast ratio of yellow primary to the contrast ratio of red primary | proportion of the contrast ratio of yellow primary to the contrast ratio of green primary | proportion of the contrast ratio of yellow primary to the contrast ratio of blue primary |
|---|---|---|
| 1.5 | 1 | 1 |

The Ninth Embodiment

Figure 11:
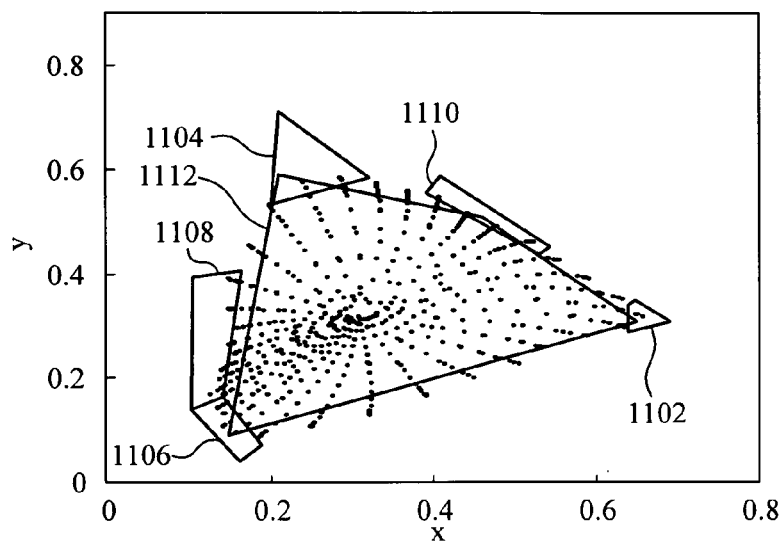
FIG. 11 is a CIE 1931 chromaticity diagram according to a ninth embodiment of the present invention.

FIG. 11 is a CIE 1931 chromaticity diagram according to a ninth embodiment of the present invention. Respectively, the red primary falls within the polygon 1102, the green primary falls within the polygon 1104, the blue primary falls within a polygon 1106, the cyan primary falls within the polygon 1108, and the yellow primary falls within the polygon 1110. The dots represent the natural color. In the ninth embodiment, the coordinates of the multiple primaries and the proportions of the contrast ratio of one primary to the contrast ratio of the other primaries are limited within the specific range, e.g. the polygon 1112, in the chromaticity diagram.

In the ninth embodiment, in Table 18, the coordinates of the multiple primaries represent the chromatic values of red primary, green primary, blue primary and the yellow primary are selected from Table 1. Additionally, according to the above-mentioned simulation method, the proportions of the contrast ratio of the yellow primary to the contrast ratio of the other primaries are obtained as shown in Table 19.

TABLE 18

|  | x coordinate | y coordinate |
|---|---|---|
| chromatic value of red primary | 0.65 | 0.31 |
| chromatic value of green primary | 0.21 | 0.59 |
| chromatic value of blue primary | 0.15 | 0.09 |
| chromatic value of yellow primary | 0.46 | 0.51 |

TABLE 19

| proportion of the contrast ratio of yellow primary to the contrast ratio of red primary | proportion of the contrast ratio of yellow primary to the contrast ratio of green primary | proportion of the contrast ratio of yellow primary to the contrast ratio of blue primary |
|---|---|---|
| 1.94 | 1.94 | 1.33 |

The Tenth Embodiment

Figure 12:
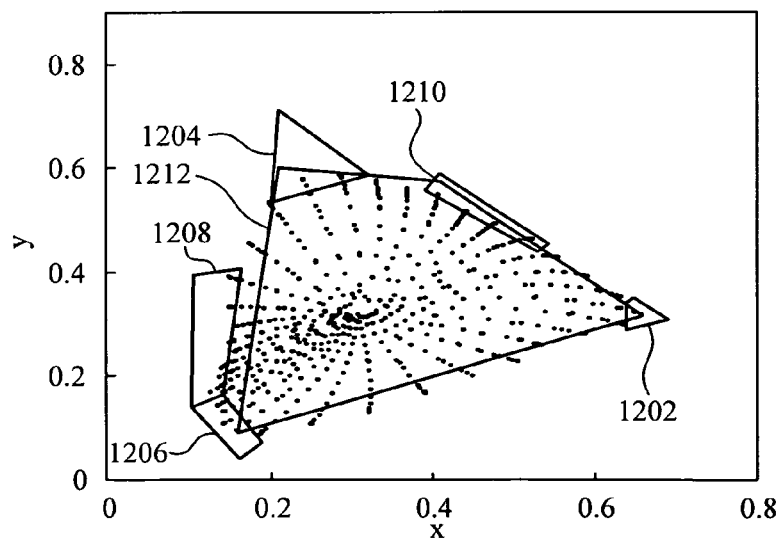
FIG. 12 is a CIE 1931 chromaticity diagram according to a tenth embodiment of the present invention.

FIG. 12 is a CIE 1931 chromaticity diagram according to a tenth embodiment of the present invention. Respectively, the red primary falls within the polygon 1202, the green primary falls within the polygon 1204, the blue primary falls within a polygon 1206, the cyan primary falls within the polygon 1208, and the yellow primary falls within the polygon 1210. The dots represent the natural color. In the ninth embodiment, the coordinates of the multiple primaries and the proportions of the contrast ratio of one primary to the contrast ratio of the other primaries are limited within the specific range, e.g. the polygon 1212, in the chromaticity diagram.

In the ninth embodiment, in Table 20, the coordinates of the multiple primaries represent the chromatic values of red primary, green primary, blue primary and the yellow primary are selected from Table 1. Additionally, according to the above-mentioned simulation method, the proportions of the contrast ratio of the yellow primary to the contrast ratio of the other primaries are obtained as shown in Table 21.

TABLE 20

|  | x coordinate | y coordinate |
|---|---|---|
| chromatic value of red primary | 0.661 | 0.317 |
| chromatic value of green primary | 0.21 | 0.6 |
| chromatic value of blue primary | 0.16 | 0.09 |
| chromatic value of yellow primary | 0.41 | 0.575 |

TABLE 21

| proportion of the contrast ratio of yellow primary to the contrast ratio of red primary | proportion of the contrast ratio of yellow primary to the contrast ratio of green primary | proportion of the contrast ratio of yellow primary to the contrast ratio of blue primary |
|---|---|---|
| 2.39 | 2.39 | 1.64 |

In view of all of the above and the Figures, it should be readily apparent to those skilled in the art that when the new primary that is displayed by means of the sub-pixel 112 or the color filter unit 212 is the yellow primary, the yellow primary falls within the polygon defined by following vertexes in the CIE 1931 chromaticity diagram:

|  | x coordinate | y coordinate |
|---|---|---|
| vertex 1 | 0.53 | 0.44 |
| vertex 2 | 0.544 | 0.454 |
| vertex 3 | 0.408 | 0.589 |
| vertex 4 | 0.39 | 0.556 | and the proportions of a contrast ratio of the yellow primary to the contrast ratio of the other primaries are:

0.58≦the proportion of the contrast ratio of the yellow primary to the contrast ratio of the red primary<2.4;

0.39≦the proportion of the contrast ratio of the yellow primary to the contrast ratio of the green primary<2.4; and 0.58≦the proportion of the contrast ratio of the yellow primary to the contrast ratio of the blue primary<1.78.

On the other hands, when the new primary that is displayed by means of the sub-pixel 112 or the color filter unit 212 is the cyan primary, the cyan primary falls within the polygon defined by following vertexes in the CIE 1931 chromaticity diagram:

|  | x coordinate | y coordinate |
|---|---|---|
| vertex 1 | 0.165 | 0.408 |
| vertex 2 | 0.142 | 0.165 |
| vertex 3 | 0.104 | 0.141 |
| vertex 4 | 0.106 | 0.396 |

And the proportions of a contrast ratio of the cyan primary to the contrast ratio of the other primaries are:

0.41≦the proportion of the contrast ratio of the cyan primary to the contrast ratio of the red primary<4.86;

0.28≦the proportion of the contrast ratio of the cyan primary to the contrast ratio of the green primary<4.86; and 0.28≦the proportion of the contrast ratio of the cyan primary to the contrast ratio of the blue primary<4.39.

Moreover, in the other embodiment, the new primary that is displayed by means of the sub-pixel 112 or the color filter unit 212 may include the yellow primary and the cyan primary. The coordinates of the yellow and cyan primaries and the proportions of a contrast ratio of one primary to the contrast ratio of the other primaries are also limited within the specific range in the chromaticity diagram.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A display device, comprising:
   a plurality of pixels, each pixel having at least four sub-pixels, wherein the sub-pixels respectively display a red primary, a green primary, a blue primary and a yellow primary, where the yellow primary falls within a polygon defined by following vertexes in a CIE 1931 chromaticity diagram:

|  | x coordinate | y coordinate |
|---|---|---|
| vertex 1 | 0.53 | 0.44 |
| vertex 2 | 0.544 | 0.454 |
| vertex 3 | 0.408 | 0.589 |
| vertex 4 | 0.39 | 0.556 | and proportions of a contrast ratio of the yellow primary to the contrast ratio of the other primaries are:

0.58≦the proportion of the contrast ratio of the yellow primary to the contrast ratio of the red primary≦2.4;

0.39≦the proportion of the contrast ratio of the yellow primary to the contrast ratio of the green primary≦2.4; and 0.58≦the proportion of the contrast ratio of the yellow primary to the contrast ratio of the blue primary≦1.78.

2. The display device as claimed in claim 1, wherein one of the sub-pixels displays a cyan primary, where the cyan primary falls within a polygon defined by following vertexes in the CIE 1931 chromaticity diagram:

|  | x coordinate | y coordinate |
|---|---|---|
| vertex 1 | 0.165 | 0.408 |
| vertex 2 | 0.142 | 0.165 |
| vertex 3 | 0.104 | 0.141 |
| vertex 4 | 0.106 | 0.396 | and proportions of the contrast ratio of the cyan primary to the contrast ratio of the other primaries are:

0.41≦the proportion of the contrast ratio of the cyan primary to the contrast ratio of the red primary≦4.86;

0.28≦the proportion of the contrast ratio of the cyan primary to the contrast ratio of the green primary≦4.86; and 0.28≦the proportion of the contrast ratio of the cyan primary to the contrast ratio of the blue primary≦4.39.

3. The display device as claimed in claim 1, wherein the red primary, the green primary and the blue primary respectively fall within polygons defined by following vertexes in the CIE 1931 chromaticity diagram:

|  |  | x coordinate | y coordinate |
|---|---|---|---|
| a first polygon | vertex 1 | 0.64 | 0.29 |
|  | vertex 2 | 0.691 | 0.308 |
|  | vertex 3 | 0.648 | 0.351 |
|  | vertex 4 | 0.64 | 0.34 |
| a second polygon | vertex 1 | 0.32 | 0.587 |
|  | vertex 2 | 0.2 | 0.535 |
|  | vertex 3 | 0.21 | 0.71 |
| a third polygon | vertex 1 | 0.19 | 0.072 |
|  | vertex 2 | 0.162 | 0.04 |

-continued

|          | x coordinate | y coordinate |
|----------|--------------|--------------|
| vertex 3 | 0.104        | 0.141        |
| vertex 4 | 0.142        | 0.165        |

4. A display device, comprising:
a plurality of pixels, each pixel having at least four sub-pixels, wherein the sub-pixels respectively display a red primary, a green primary, a blue primary and a cyan primary, where the cyan primary falls within a polygon defined by following vertexes in a CIE 1931 chromaticity diagram:

|          | x coordinate | y coordinate |
|----------|--------------|--------------|
| vertex 1 | 0.165        | 0.408        |
| vertex 2 | 0.142        | 0.165        |
| vertex 3 | 0.104        | 0.141        |
| vertex 4 | 0.106        | 0.396        | and proportions of a contrast ratio of the cyan primary to the contrast ratio of the other primaries are:
  $0.41 \leq$ the proportion of the contrast ratio of the cyan primary to the contrast ratio of the red primary $\leq 4.86$;
  $0.28 \leq$ the proportion of the contrast ratio of the cyan primary to the contrast ratio of the green primary $\leq 4.86$; and
  $0.28 \leq$ the proportion of the contrast ratio of the cyan primary to the contrast ratio of the blue primary $\leq 4.39$.

5. The display device as claimed in claim 4, wherein the red primary, the green primary and the blue primary respectively fall within polygons defined by following vertexes in the CIE 1931 chromaticity diagram:

|                |          | x coordinate | y coordinate |
|----------------|----------|--------------|--------------|
| a first polygon | vertex 1 | 0.64        | 0.29         |
|                | vertex 2 | 0.691        | 0.308        |
|                | vertex 3 | 0.648        | 0.351        |
|                | vertex 4 | 0.64         | 0.34         |
| a second polygon | vertex 1 | 0.32      | 0.587        |
|                | vertex 2 | 0.2          | 0.535        |
|                | vertex 3 | 0.21         | 0.71         |
| a third polygon | vertex 1 | 0.19        | 0.072        |
|                | vertex 2 | 0.162        | 0.04         |
|                | vertex 3 | 0.104        | 0.141        |
|                | vertex 4 | 0.142        | 0.165        |

6. A color filter for use in a flat-panel display, comprising:
a plurality of color filter units, wherein the color filter units respectively generates a red primary, a green primary, a blue primary and a yellow primary, where the yellow primary falls within a polygon defined by following vertexes in a CIE 1931 chromaticity diagram:

|          | x coordinate | y coordinate |
|----------|--------------|--------------|
| vertex 1 | 0.53         | 0.44         |
| vertex 2 | 0.544        | 0.454        |
| vertex 3 | 0.408        | 0.589        |
| vertex 4 | 0.39         | 0.556        | and proportions of a contrast ratio of the yellow primary to the contrast ratio of the other primaries are:
  $0.58 \leq$ the proportion of the contrast ratio of the yellow primary to the contrast ratio of the red primary $\leq 2.4$;
  $0.39 \leq$ the proportion of the contrast ratio of the yellow primary to the contrast ratio of the green primary $\leq 2.4$; and
  $0.58 \leq$ the proportion of the contrast ratio of the yellow primary to the contrast ratio of the blue primary $\leq 1.78$.

7. The color filter as claimed in claim 6, wherein one of the color filter units generates a cyan primary, where the cyan primary falls within a polygon by following vertexes in the CIE 1931 chromaticity diagram:

|          | x coordinate | y coordinate |
|----------|--------------|--------------|
| vertex 1 | 0.165        | 0.408        |
| vertex 2 | 0.142        | 0.165        |
| vertex 3 | 0.104        | 0.141        |
| vertex 4 | 0.106        | 0.396        | and proportions of a contrast ratio of the cyan primary to the contrast ratio of the other primaries are:
  $0.41 \leq$ the proportion of the contrast ratio of the cyan primary to the contrast ratio of the red primary $\leq 4.86$;
  $0.28 \leq$ the proportion of the contrast ratio of the cyan primary to the contrast ratio of the green primary $\leq 4.86$; and
  $0.28 \leq$ the proportion of the contrast ratio of the cyan primary to the contrast ratio of the blue primary $\leq 4.39$.

8. The color filter as claimed in claim 6, wherein the red primary, the green primary and the blue primary respectively fall within polygons defined by following vertexes in the CIE 1931 chromaticity diagram:

|                |          | x coordinate | y coordinate |
|----------------|----------|--------------|--------------|
| a first polygon | vertex 1 | 0.64        | 0.29         |
|                | vertex 2 | 0.691        | 0.308        |
|                | vertex 3 | 0.648        | 0.351        |
|                | vertex 4 | 0.64         | 0.34         |
| a second polygon | vertex 1 | 0.32      | 0.587        |
|                | vertex 2 | 0.2          | 0.535        |
|                | vertex 3 | 0.21         | 0.71         |
| a third polygon | vertex 1 | 0.19        | 0.072        |
|                | vertex 2 | 0.162        | 0.04         |
|                | vertex 3 | 0.104        | 0.141        |
|                | vertex 4 | 0.142        | 0.165        |

9. A display device, comprising:
a plurality of color filter units, wherein the color filter units respectively generates a red primary, a green primary, a blue primary and a cyan primary, where the cyan primary falls within a polygon defined by following vertexes in a CIE 1931 chromaticity diagram:

|          | x coordinate | y coordinate |
|----------|--------------|--------------|
| Vertex 1 | 0.165        | 0.408        |
| Vertex 2 | 0.142        | 0.165        |
| Vertex 3 | 0.104        | 0.141        |
| Vertex 4 | 0.106        | 0.396        | and proportions of a contrast ratio of the cyan primary to the contrast ratio of the other primaries are:
  $0.41 \leq$ the proportion of the contrast ratio of the cyan primary to the contrast ratio of the red primary $\leq 4.86$;

0.28≦the proportion of the contrast ratio of the cyan primary to the contrast ratio of the green primary≦4.86; and 0.28≦the proportion of the contrast ratio of the cyan primary to the contrast ratio of the blue primary≦4.39.

10. The display device as claimed in claim 9, wherein the red primary, the green primary and the blue primary respectively fall within polygons defined by following vertexes in the CIE 1931 chromaticity diagram:

|   |   | x coordinate | y coordinate |
|---|---|---|---|
| a first polygon | vertex 1 | 0.64 | 0.29 |
|  | vertex 2 | 0.691 | 0.308 |
|  | vertex 3 | 0.648 | 0.351 |
|  | vertex 4 | 0.64 | 0.34 |
| a second polygon | vertex 1 | 0.32 | 0.587 |
|  | vertex 2 | 0.2 | 0.535 |
|  | vertex 3 | 0.21 | 0.71 |
| a third polygon | vertex 1 | 0.19 | 0.072 |
|  | vertex 2 | 0.162 | 0.04 |
|  | vertex 3 | 0.104 | 0.141 |
|  | vertex 4 | 0.142 | 0.165 |

* * * * *